United States Patent [19]
Takeuchi et al.

[11] Patent Number: 5,820,051
[45] Date of Patent: Oct. 13, 1998

[54] SPINNING REEL WITH SPOOL THAT IS PREVENTED FROM ROTATING RELATIVE TO SPOOL SHAFT DURING CASTING

[75] Inventors: Shinji Takeuchi, Hiroshima; Yukio Ito, Tokyo, both of Japan

[73] Assignee: Daiwa Seiko, Inc., Tokyo, Japan

[21] Appl. No.: 725,761

[22] Filed: Oct. 4, 1996

[30] Foreign Application Priority Data

Oct. 4, 1995 [JP] Japan ................................. 7-282550
Jan. 23, 1996 [JP] Japan ................................. 8-028520

[51] Int. Cl.$^6$ ............................................. A01K 89/01
[52] U.S. Cl. ........................... 242/232; 242/233; 242/247
[58] Field of Search ................................... 242/231, 232, 242/233, 243, 247

[56] References Cited

U.S. PATENT DOCUMENTS

| | | |
|---|---|---|
| 3,045,942 | 7/1962 | Henze . |
| 3,987,976 | 10/1976 | Lilland .................................. 242/232 |
| 4,509,705 | 4/1985 | Councilman et al. . |
| 4,892,267 | 1/1990 | Webb ................................. 242/232 X |
| 5,348,245 | 9/1994 | Sugawara ........................... 242/233 X |
| 5,586,734 | 12/1996 | Kawabe et al. ......................... 242/247 |

FOREIGN PATENT DOCUMENTS

| | | |
|---|---|---|
| 0 026 084 | 4/1981 | European Pat. Off. . |
| 0 467 812 | 1/1992 | European Pat. Off. . |
| 1 561 190 | 2/1969 | France . |
| 2 462 098 | 7/1979 | France . |
| 6-37656 | 10/1994 | Japan . |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

A spinning reel for fishing in which a return operation to return a bail to its fishing line retrieving position after casting of a fishing line as well as removal of the unrotatable state of a spool can be carried out automatically and easily. The spinning reel for fishing has a structure which includes a reverse-function lever (6) to be operated by a bail support member (29), a connecting body (5) which is movably fitted with the outer periphery of a large-diameter cylindrical portion (2c) of a rotor (2) connected to the reverse-function lever (6) and also which is fitted with a spool (3) in such a manner that it is free to move but is always prevented against rotation, and a lock member (7) which is fitted with a spool shaft (4) movably but unrotatably.

5 Claims, 15 Drawing Sheets

SPINNING REEL WITH SPOOL THAT IS PREVENTED FROM ROTATING RELATIVE TO SPOOL SHAFT DURING CASTING

BACKGROUND OF THE INVENTION

The present invention relates to a spinning reel for fishing which is improved in the efficiency of an operation to cast a fishing line.

In a conventional spinning reel for fishing of a type which includes a drag mechanism in front of a spool, when a fishing line is released by throwing the terminal tackles of the spinning reel while reversing a bail, if a drag force is set at a weak level in consideration of a fear that a fishing line may be cut when fish hits a bait, a spool is rotated inadvertently due to the weight of the terminal tackles so that the fishing line is allowed to be released. This may result in an occurrence of damage of operator's fingers as well as making it impossible to throw the terminal tackles.

In order to solve this problem or difficulty, as described in Japanese Utility Model Publication No. Hei-637656, there is known a structure in which the rotation of a spool can be locked in linking with the fishing line casting operation of a bail.

However, with the structure disclosed in the above publication, since the spool is locked to and engaged with a reel main body through a lock member supported on a rotor upon casting a fishing line, the rotation of the rotor is locked together with the locking of the spool, which makes it necessary for an operator to return the bail from the casting position thereof back to the retrieving position thereof directly by hand. Therefore, an operation to return the bail successively back to the fishing line retrieving position after the fishing line is released is troublesome and poor in operability.

SUMMARY OF THE INVENTION

In view of the above problem or difficulty accompanying the conventional spinning reel, the present invention is accomplished, and an object of the present invention is to provide a spinning reel for fishing which is capable of returning a bail to the fishing line retrieving position as well as releasing the unrotatable state of a spool automatically and easily after casting a fishing line during which the spool is locked to prevent it from rotating.

The above, and other objects of the present invention are met by the provision of a spinning reel for fishing of a type in which a bail is attached through a bail support member to a rotor rotatable in linking with the operation of a handle in such a manner that the bail is allowed to move between a fishing line retrieving position and a fishing line casting position and a fishing line is wound by means of the rotation of the rotor around a spool supported rotatably on a spool shaft through a drag mechanism, including a connecting member for bringing the spool into engagement with a lock member secured unrotatably to the spool shaft and for disengaging the engagement in linking with the movement of the bail between the fishing line retrieving position and the fishing line casting position, the spool being prevented from rotating when the bail is held in the fishing line casting position, and the bail being returned from the fishing line casting position back to the fishing line retrieving position through a reverse mechanism by rotating said rotor in a fishing line retrieving direction.

Also, according to the invention, in a spinning reel for fishing, the connecting member is moved in the axial direction thereof to be engaged with the lock member to thereby cause the spool to be unrotatable, when the bail is held in the fishing line casting position, and the connecting body is disengaged, from the lock member to thereby cause the spool to be rotatable, when the bail is held in the fishing line retrieving position, and wherein the bail is returned from the fishing line casting position to the fishing line retrieving position through the reverse mechanism by rotating the rotor in the fishing line retrieving direction.

Due to the above-mentioned structure of a spinning reel for fishing according to the invention, when the terminal tackles are thrown and a fishing line 40 is thereby played out far away, two bail support members 28 and 29 are respectively reversed to thereby advance the other end 6a of a reverse-function lever 6 and thus advance the connecting portion 6b of the reverse-function lever 6, and the advancement of the connecting portion 6b in turn causes a connecting body 5 to advance.

When the connecting body 5 is advanced, since a distance between a rotor 2 and a lock member 7 is maintained at a given value regardless of the forward and backward movements of a spool shaft 4, as shown in FIG. 10, the uneven portion 5b of the connecting body 5 is secured to the uneven portion 7c of the lock member 7.

When the uneven portion 5b of the connecting body 5 is secured to the uneven portion 7c of the lock member 7, the rotation of the spool 3 is secured with respect to the spool shaft 4 because a groove 3i formed axially in the inner periphery of the large-diameter cylindrical portion 3c of the spool 3 is always secured to the projecting portion 5a of the connecting body 5.

After the terminal tackles are thrown out, if a handle 11 is rotated in a direction in which a fishing line 40 is wound around the spool 3, then the rotor 2 is rotated forwardly and the other end portion 6a of the reverse-function lever 6 is thereby butted against the cam 1b of a reel main body 1 and is thus pushed in backwardly, so that the bail support members 28 and 29 are reversed to the fishing line retrieving positions thereof.

When the other end portion 6a of the reverse-function lever 6 is pushed in backwardly, then the connecting body 5 is retreated and the uneven portion 5b of the connector body 5 is thereby removed from the uneven portion 7c of the lock member 7, so that the spool 3 becomes free to rotate.

DESCRIPTION OF THE PREFERRED EMBODIMENTS

Figure 1:
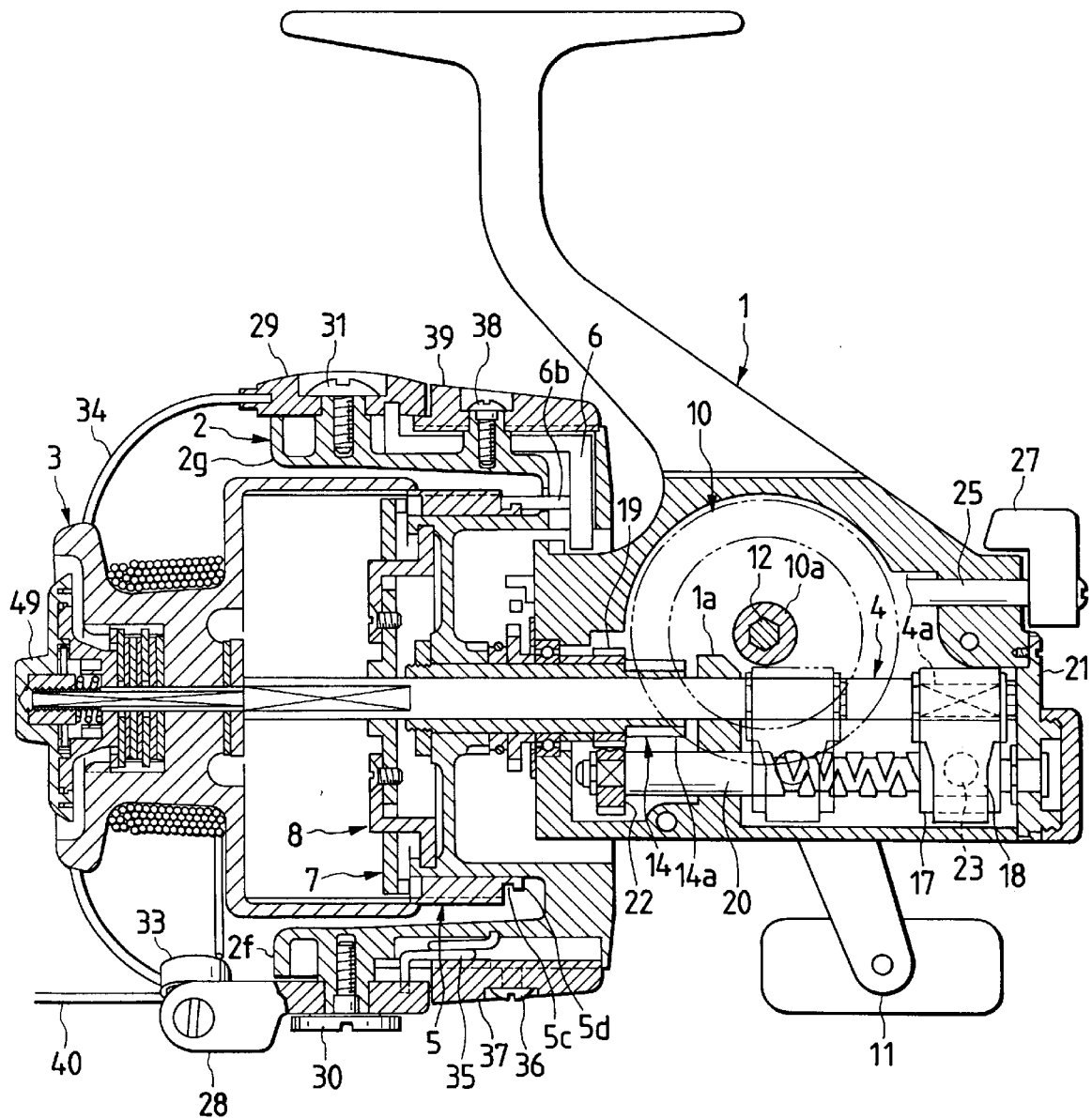
FIG. 1 is a diagram showing a side view including a sectional view of the main portions of a first embodiment of a spinning reel for fishing according to the invention.

Now, description will be given below of the invention with reference to the embodiments thereof illustrated in the accompanying drawings.

The first embodiment of the invention will be described with reference to FIGS. 1 to 10. In the present spinning reel for fishing, a rotary shaft 10a of a drive gear 10 is journaled on both sides of a reel main body 10 through bearings (not shown), while a handle shaft 12 with a handle 11 fixed thereto is inserted into and fitted with a polygonal hole formed in the center of the rotary shaft 10 in such a manner that the handle shaft 12 can be freely switched right and left.

A rotary shaft cylinder 14 is rotatably journaled by a bearing 13 on the front portion of the reel main body 1 and is also projected forwardly.

A reversal preventive ratchet wheel 15 and a rotor 2 are unrotatably fitted with the portion of the outer periphery of the rotary shaft cylinder 14 situated forwardly of the bearing 13 and are fixed thereto by a nut 16.

The base end of the rotary shaft cylinder 14 is rotatably journaled by a bearing portion 1a of the reel main body 1, a drive gear 10 is in mesh with a pinion 14a formed integrally on the front side of the base end portion of the rotary shaft cylinder 14, and the rotor 2 is supported so as to be rotated in linking with the rotation of the handle 11.

A spool shaft 4 with a spool 3 mounted on the leading end thereof is slidably inserted into the above-mentioned central hole of the rotary shaft cylinder 14 such that it can be reciprocated back and forth, while a sliding member 17 is mounted on the rear end portion 4a of the spool shaft 4 by a securing plate 18.

Within the reel main body 1 and forwardly of the pinion 14a of the rotary shaft cylinder 14, a linking gear 19 is fitted with the rotary shaft cylinder 14 in such a manner that it is prevented from rotating.

Within the reel main body 1, a traverse cam shaft 20 of a sliding mechanism is supported in parallel with the spool shaft 4 by the bearing portion 1a of the reel main body 1 and a side plate 21 mounted on the rear side of the reel main body 1.

A small gear 22 is unrotatably fitted with the leading end of the traverse cam shaft 20, while the small gear 22 is also in mesh with the above-mentioned linking gear 19.

The sliding member 17 is fitted with the traverse cam shaft 20, while the claw of an engaging member 23 provided in the sliding member 17 is in engagement with a traverse cam groove formed in the traverse cam shaft 20.

A reversal preventive claw 24 is provided adjacently to the reversal preventive ratchet wheel 15 in such a manner that it can be freely engaged with or removed from the reversal preventive ratchet wheel 15.

An operation rod 25 is rotatably mounted on the reel main body 1 such that it projects outwardly of the rear portion of the reel main body 1. A reversal preventive cam 26 is mounted on the front side of the operation rod 25, while an operation knob 27 is also mounted on the portion of the operation rod 25 that projects outwardly from the rear portion of the reel main body 1.

The rotor 2 is mounted on the rotary shaft cylinder 14 through a cylindrical portion 2a thereof, and it includes the cylindrical portion 2a, a front wall 2b, a cylindrical portion 2c having a large diameter, and a pair of support arms 2f and 2g which are respectively projected forwardly from the respective outer peripheries of the base portions 2d and 2e of the large-diameter cylindrical portion 2c.

Figure 4:
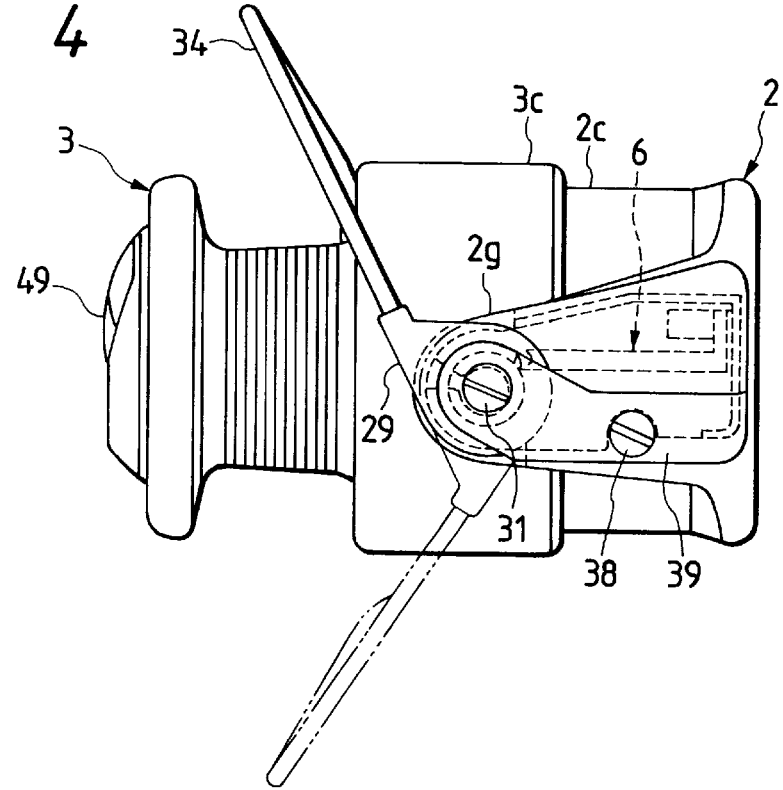
FIG. 4 is a side view of the above bail support member, rotor and spool.
Figure 5:
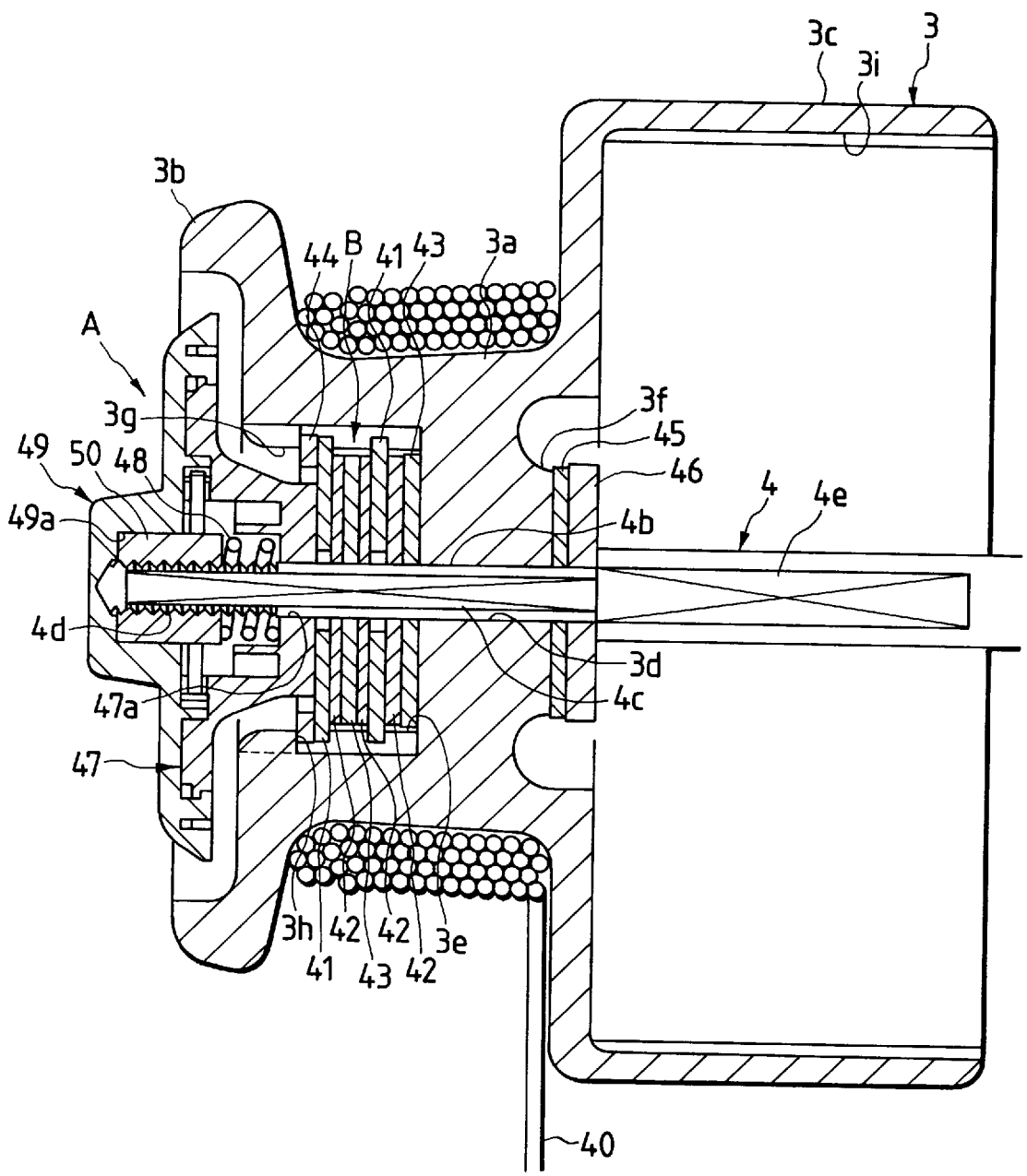
FIG. 5 is an enlarged sectional side view of the above spool.
Figure 6:
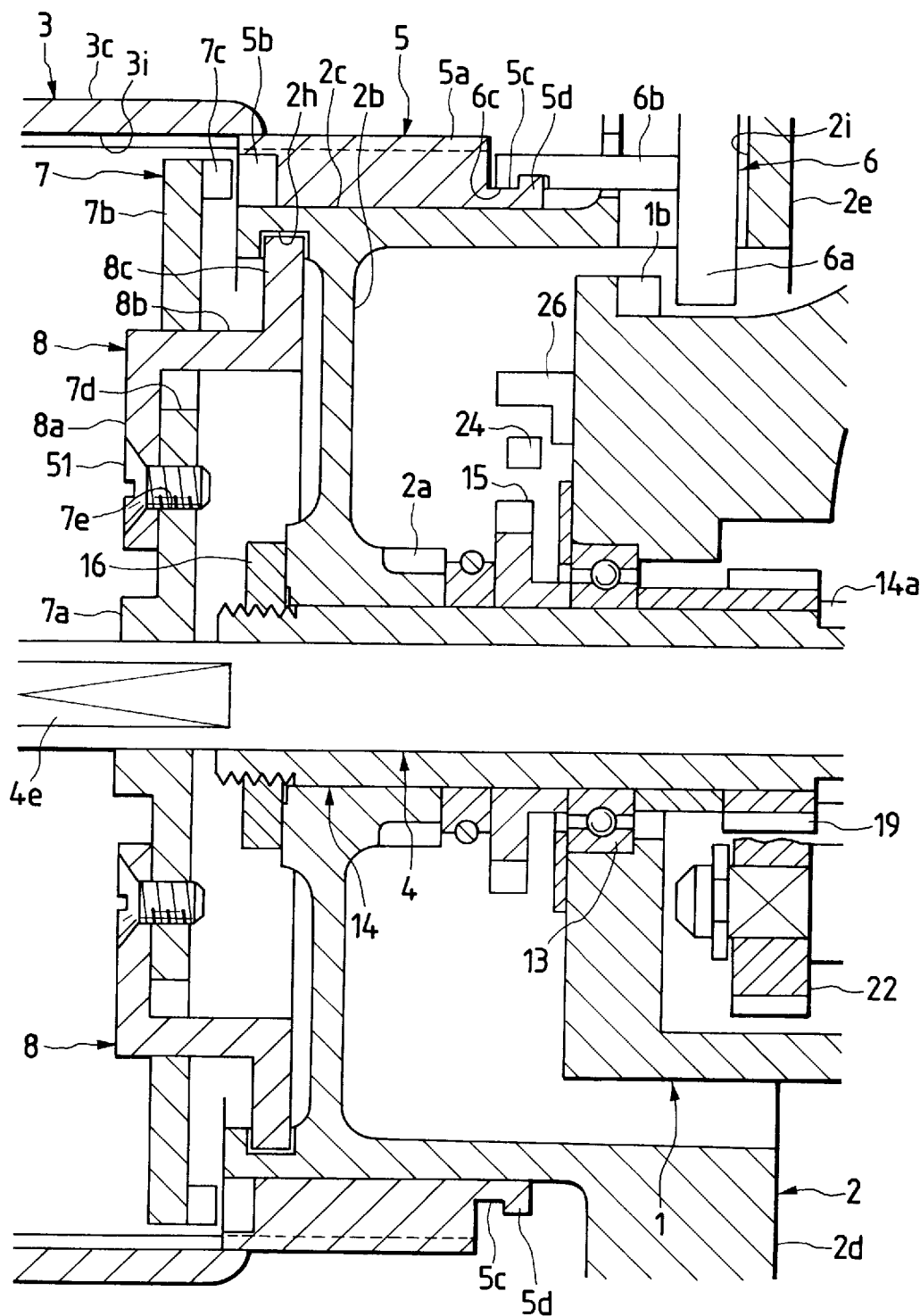
FIG. 6 is an enlarged sectional side view of the main portions of the spinning reel for fishing shown in FIG. 2.
Figure 7:
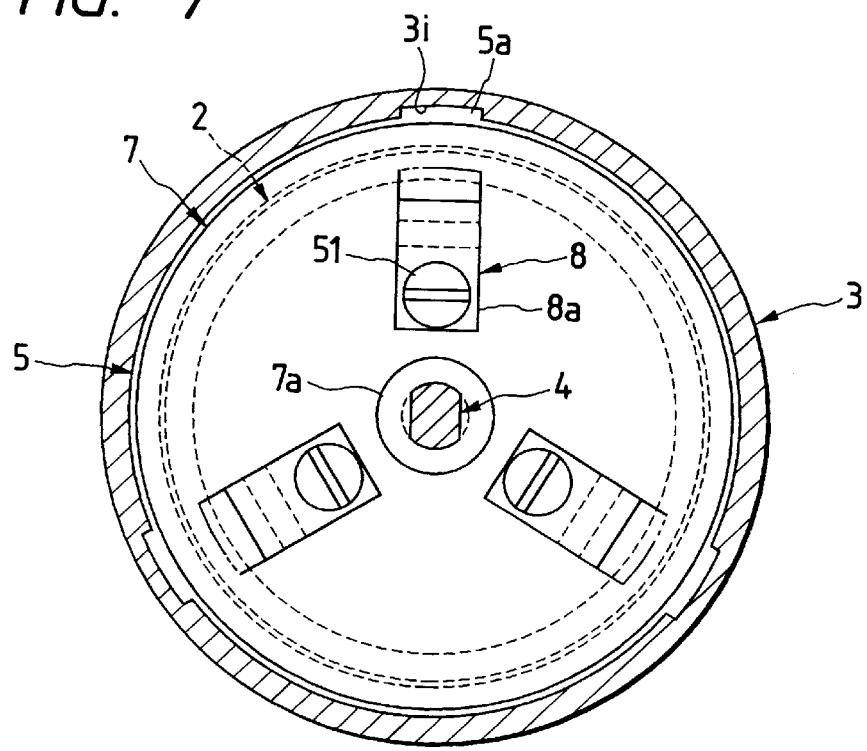
FIG. 7 is a front view of the above spool and a lock member employed in the first embodiment, with the spool shown in section.
Figure 8:
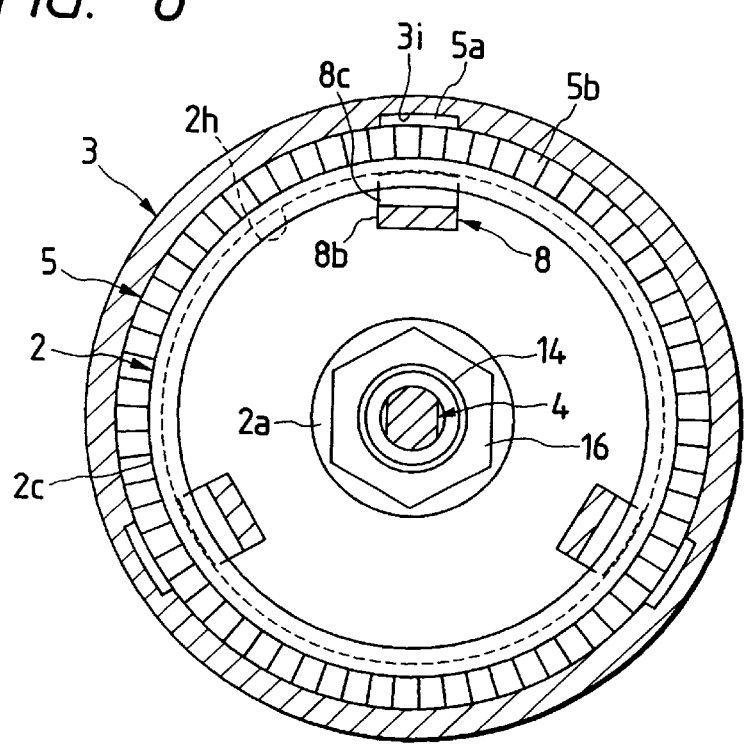
FIG. 8 is a front view of a connecting body and a reel main body respectively employed in the first embodiment, which is viewed from the back surface side of the lock member and also in which the spool is shown in section.

On the outer sides of the leading end portions of the pair of bail support arms 2f and 2g, one bail support member 28 and the other bail support member 29 are respectively journaled by means of screws 30 and 31 in such a manner that they can be freely reversed between a fishing line rewinding position shown by a solid line in FIG. 4 and a fishing line casting position shown by a two-dot chained line therein. The mounting portion 33 of a fishing line guide roller 32 is mounted on one bail support member 28.

A bail 34 is mounted between the other bail support member 29 and the mounting portion 33 of the fishing line guide roller 32.

The connecting body 5 is fitted with the outer periphery of the large-diameter cylindrical portion 2c of the rotor 2 in such a manner that it can be freely moved back and forth.

On the inside of the leading end of the large-diameter cylindrical portion 2c, there is formed a recessed groove 2h which extends in the circumferential direction of the cylindrical portion 2c.

Figure 2:
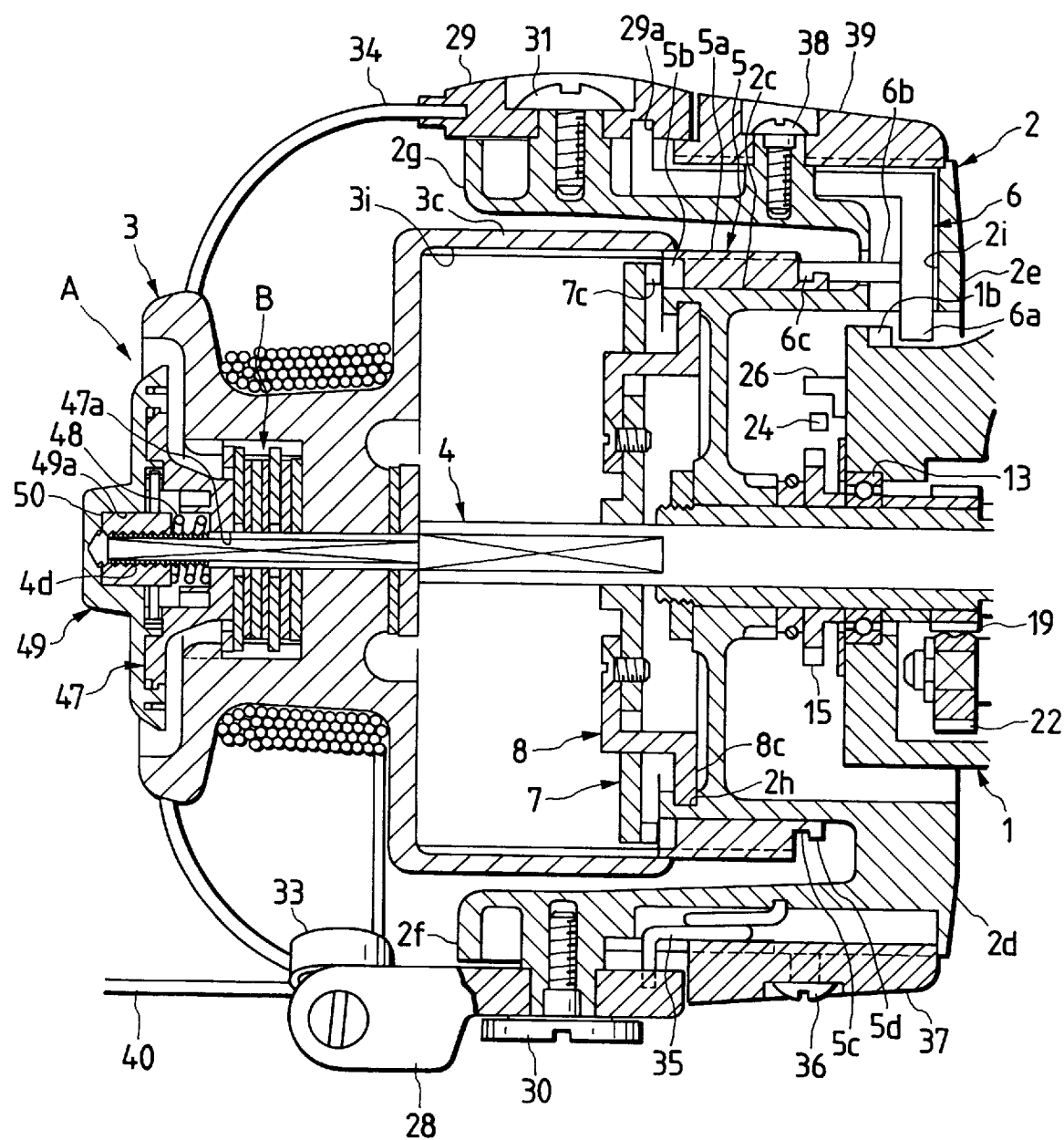
FIG. 2 is an enlarged sectional side view of the main portions of the spinning reel for fishing according to the first embodiment.
Figure 3:
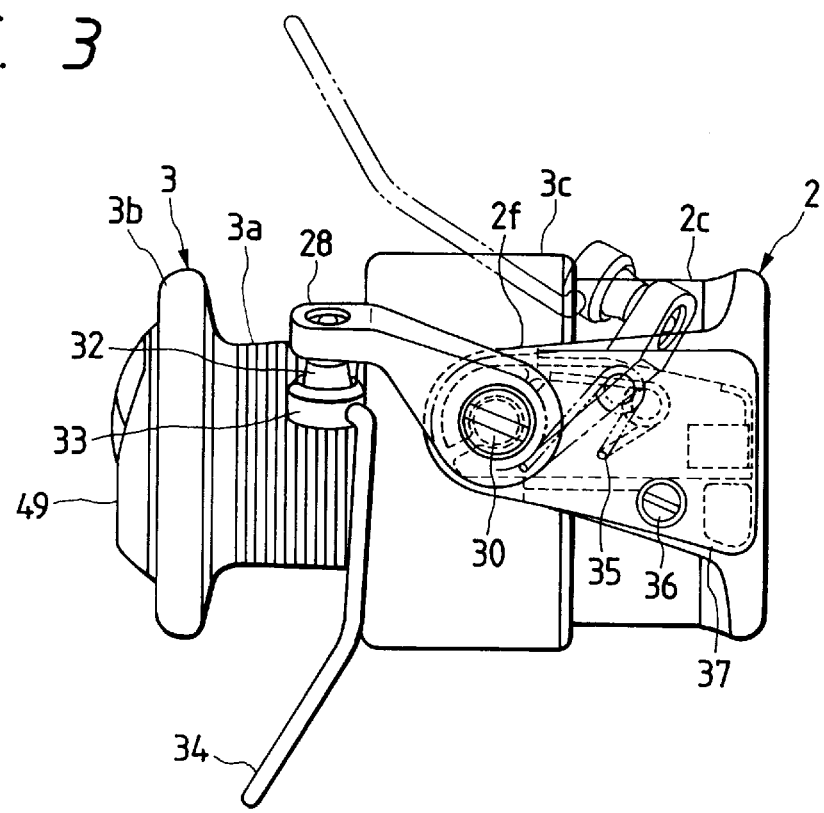
FIG. 3 is a side view of a bail support member with a fishing line guide roller mounted thereon, a rotor and a spool in the first embodiment.

Within one support arm 2f, as shown in FIGS. 1 to 3, there is provided a torsion spring 35 in such a manner that one end thereof is secured within the support arm 2f and the other end thereof is secured to the bail support member 28. The torsion spring 35 is structured such that it can energize the one bail support member 28, the other bail support member 29, the mounting portion 33 of the fishing line guide roller 32, and the bail 34 respectively to be switched over between their respective fishing line retrieving position and fishing line casting position. Also, the torsion spring 35 is covered with a cover 37 which is fixed by a screw 36.

On the other hand, within the other bail support arm 2g, as shown in FIGS. 1, 2 and 4, there is disposed an L-shaped reverse-function lever 6 structured such that it can reverse the one bail support member 28, the other bail support member 29, the mounting portion 33 of the fishing line guide roller 32, and the bail 34 respectively from their respective fishing line casting positions shown by two-dot chained lines to their respective fishing line rewinding positions shown by solid lines.

Within the bail support arm 2g, the reverse-function lever 6 is similarly covered with a cover 39 fixed by a screw 38.

The spool 3 includes a fishing line winding barrel portion 3a, which is situated in the outer periphery of the spool 3 and around which a fishing line 40 can be wound, a flange portion 3b situated on the front side of the spool 3, a large-diameter cylindrical portion 3c situated on the rear side thereof, a through hole 3d which is formed in the central portion thereof and into which is fitted the leading end small-diameter portion 4b of the spool shaft 4, a recessed portion 3e which is formed in the front portion thereof and in which a brake plate 41, a brake plate 42 and a friction plate 43 of brake means B of a drag mechanism A are respectively stored, and a shaft cylindrical portion 3f situated on the rear side thereof.

Within the recessed portion 3e, there are formed two strips of recessed portions 3g into which is engaged the projecting portion of the outer periphery of the brake plate 41, and a securing stepped portion 3h consisting of a recessed portion which extends in the peripheral direction of the front side inner periphery of the recessed portion 3e and outwardly in the diameter direction of the rotor 3 from the same inner periphery and also to which a slippage preventive ring 44 of the brake means B can be secured.

In the inner periphery of the large-diameter cylindrical portion 3c of the spool 3, there are formed a plurality of grooves 3i which respectively extend in the axial direction of the spool 3.

In the outer periphery of the leading end small-diameter portion 4b of the spool shaft 4, there is provided a rotation preventive portion 4c and, in the leading end portion of the small-diameter portion 4b, there is formed a screw portion 4d.

The brake plates 41, brake plates 42 and friction plates 43 of the brake member B are respectively fitted with the outer periphery of the leading end small-diameter portion 4b of the spool shaft 4, while the brake plates 42 are further prevented from rotating by the rotation preventive portion 4c.

When the spool 3 is fitted with the leading end small-diameter portion 4b of the spool shaft 4, a friction plate 45 and a brake plate 46 are held between the stepped portion of the leading end small-diameter portion 4b and the shaft cylindrical portion 3f.

A rotation preventive hole 47a formed in a pressure member 47 of the drag mechanism A is fitted with the outer periphery of the rotation preventive portion 4c of the leading end small-diameter portion 4b of the spool shaft 4 in such a manner that it is prevented from rotating, while a spring 48 is inserted into the rotation preventive hole 47a.

A nut 50, which is provided within a recessed portion 49a formed in a knob 49 of the drag mechanism A, is in threaded engagement with the threaded portion 4d of the leading end small-diameter portion 4b of the spool shaft 4.

In the portion of the outer periphery of the spool shaft 4 that is projected out from the rotary shaft cylinder 14, there is formed a rotation preventive portion 4e, while a disc-shaped lock member 7 is fitted with the rotation preventive portion 4e in such a manner that it is free to move in the axial direction of the spool shaft 4 but it is prevented from rotating in the circumferential direction thereof.

The connecting body 5 is formed in a cylindrical shape and is movably fitted with the outer periphery of the large-diameter cylindrical portion 2c of the rotor 2. Also, the connecting body 5 includes two or more strips of projecting portions 5a respectively provided on the outer periphery thereof and extending in the axial direction thereof, a teeth-shaped uneven portion 5b formed in the front end portion thereof, and a projecting portion 5b defined by a recessed groove 5c which is formed in the rear side outer periphery of the connecting body 5 and extends in the circumferential direction thereof.

The projecting portions 5a of the connecting body 5 are always movably fitted with the grooves 3i which are formed in the inner periphery of the large-diameter cylindrical portion 3c of the spool 3, respectively.

One end of the reverse-function lever 6 is inserted into a hole 29a formed in the bail support member 29, while the other end 6a thereof is so formed as to face downward and is inserted into a through hole 2i formed in the base portion 2e of the rotor 2.

The other end 6a of the reverse-function lever 6 is so disposed as to face a cam 1b provided in the reel main body 1 shown in FIGS. 1 and 2, so that the other end portion 6a of the lever 6 can be butted against the cam 1b.

Also, in the other end portion 6a of the reverse-function lever 6, there is formed a connecting portion 6b which faces forwardly, and, in the leading end portion of the connecting portion 6b, there is formed a hook portion 6c which faces downwardly.

The hook portion 6c is fitted into the recessed groove 5c and is thereby secured to the projecting portion 5d.

The central cylindrical portion 7a of the lock member 7 is fitted with the rotation preventive portion 4e formed in the outer periphery of the spool shaft 4 in such a manner that it is free to move in the axial direction thereof but is prevented from rotating.

On the rotor 2 side of the outer peripheral edge of the plate portion 7b of the lock member 7, there is formed a teeth-shaped uneven portion 7c in such a manner that it faces the uneven portion 5b of the connecting body 5 in a meshable manner.

In the plate portion 7b of the lock member 7, there are formed a plurality of through holes 7d and screw holes 7e respectively extending in the radial direction thereof, while a position restrict member 8 is fixed through the screw holes 7e to the lock member 7 by a screw 51.

The position restrict member 8 includes a fixing portion 8a to be secured to the plate portion 7b of the lock member 7 by the screw 51, a connecting portion 8b projecting backwardly through the through hole 7d of the lock member 7, and a securing portion 8c to be secured to a recessed groove 2h of the rotor 2.

When the securing portion 8c of the position restrict member 8 is secured to the recessed groove 2h of the rotor 2, the gap between the rotor 2 and the lock member 7 can be left fixed or kept constant even if the spool shaft 4 is moved back and forth.

In the first embodiment, the engaging and removing mechanism, which engages the spool 3 with the lock member secured unrotatably to the spool shaft 4 and removing the engagement therebetween in linking with the reversing operation to reverse the bail support members 28 and 29 from their respective fishing line rewinding states to their respective fishing line casting states, is constituted by the reverse-function lever 6 which is actuated by the bail support member 29, the connecting body 5 which is movably fitted with the outer periphery of the large-diameter cylindrical portion 2c of the rotor 2 connected to the reverse-function lever 6 and also is movably fitted with the spool 3 such that it is always prevented from rotating, and the lock member 7 which is fitted with the spool shaft 4 movably but in a rotation preventive manner.

Now, referring to the operation of the above-mentioned spinning reel for fishing, when one bail support member 28 and the other bail support member 29 are respectively held at their respective fishing line rewinding positions, if the handle 11 is rotated in a direction where the fishing line 40 is wound around the spool 3, then the drive gear 10 is rotated so that the rotary shaft cylinder 14 and rotor 2 are rotated forwardly through the opinion 14a.

Further, in linking with the rotation of the drive gear 10, the traverse cam shaft 20 is rotated through the linking gear 19 and small gear 22, so that the sliding member 17, spool shaft 4 and spool 3 are respectively reciprocated back and forth.

Referring to the adjustment of the brake force of the brake means B of the drag mechanism A, if the knob 49 is rotated, then the pressure member 47 is advanced and retreated in the axial direction thereof and, in particular, if the pressure member 47 is advanced, then the brake plates 41, brake plates 42, friction plates 43, friction plate 45 and brake plate 46 of the brake means B are pushed by the pressure member 47 to thereby be able to adjust or increase the brake force of the brake means B.

To prevent the rotor 2 against reverse rotation, the operation knob 27, operation rod 25 and reversal preventive claw 24 are rotated to thereby bring the reversal preventive claw 24 into engagement with the reversal preventive ratchet wheel 15.

When, with the rotor 2 prevented against reverse rotation, fishing is carried out and the fishing line 40 is pulled by fish hitting the bait to thereby cause the spool 3 to rotate reversely, then the brake force of the drag mechanism A will be applied between the spool 3 and spool shaft 4.

When the terminal tackles are thrown and thus the fishing line 40 is played out far away, the two bail support members 28 and 29 are reversed to their respective fishing line casting positions and the fishing rod can be swung down vigorously.

When the two bail support members 28 and 29 are reversed to their respective fishing line casting positions, then the other end portion 6a of the reverse-function lever 6 is advanced.

As the other end portion 6a of the reverse-function lever 6 is advanced, the other end portion 6a is moved to an abutting position where it can be butted against the cam 1b provided in the reel main body 1.

Further, with the advancement of the other end portion 6a of the reverse-function lever 6, the connecting portion 6b is advanced and, with the advancement of the connecting portion 6b, the connecting body 5 is in turn advanced.

Figure 9:
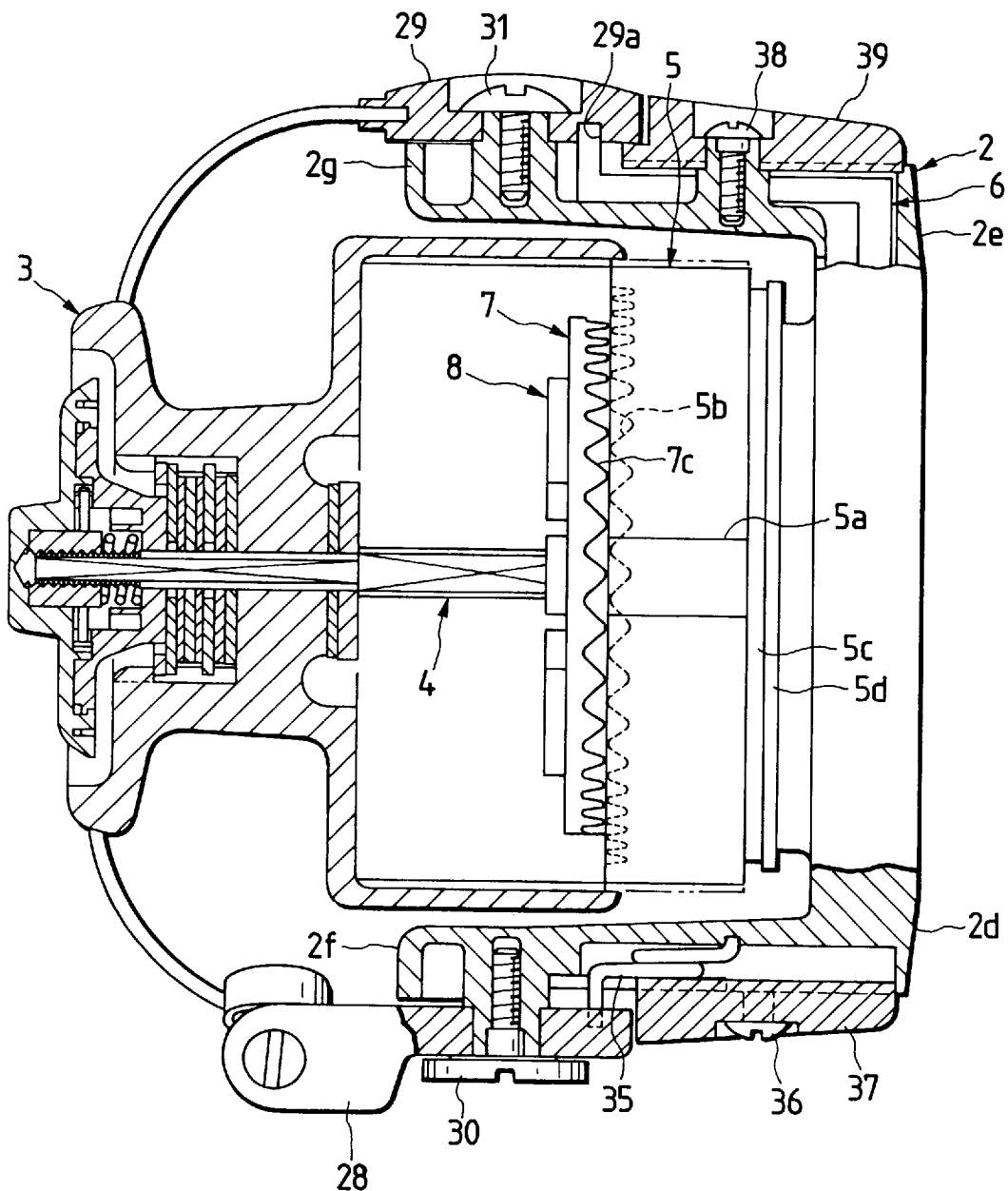
FIG. 9 is an enlarged sectional side view of the main portions of the spinning reel for fishing, with the lock member and connecting body shown in side views thereof.
Figure 10:
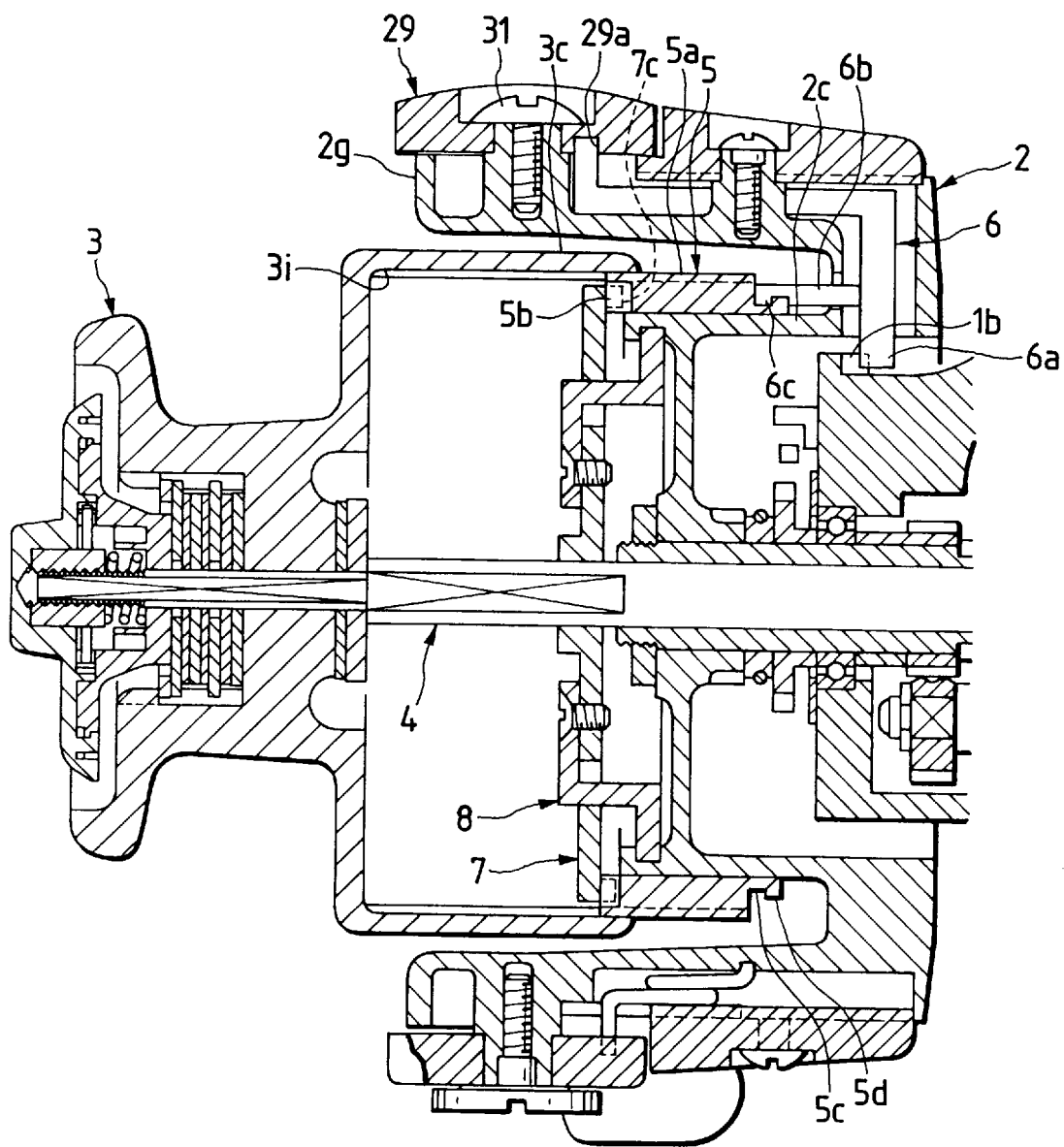
FIG. 10 an enlarged sectional side view of the spinning reel for fishing, showing a state thereof in which the spool is prevented against rotation.

When the connecting body 5 is advanced, since the gap between the rotor 2 and lock member 7 is maintained constant regardless of the back-and-forth movement of the spool shaft 4, the uneven portion 5b of the connecting body 5 can be secured to the uneven portion 7c of the lock member 7, that is, it turns from the state shown in FIG. 9 to the state shown FIG. 10.

When the uneven portion 5b of the connecting body 5 is secured to the uneven portion 7c of the lock member 7, because the axially extending grooves 3i formed in the inner periphery of the large-diameter cylindrical portion 3c of the spool 3 are always in engagement with the projecting portions 5a of the connecting body 5, the spool 3 is secured or prevented from rotating with respect to the spool shaft 4.

After the terminal tackles are thrown away, if the handle 11 is rotated in a direction where the fishing line 40 can be wound around the spool 3, then the drive gear 10 is rotated and the rotary shaft cylinder 14 and rotor 2 are thereby rotated forwardly through the pinion 14a.

When the rotor 2 is rotated forwardly, then the other end portion 6a if the reverse-function lever 6 is butted against the cam 1b of the reel main body 1 and is thereby pushed in backwardly, so that the two bail support members 28 and 29 are reversed to the fishing line take-up positions, respectively.

When the other end portion 6a of the reverse-function lever 6 is pushed in backwardly, then the connecting body 5 is retreated to thereby cause the uneven portion 5b of the connecting body 5 to part away from the uneven portion 7b of the lock member 7, so that the spool 3 is set free to rotate.

In the terminal tackles throwing operation, if the rotation of the spool 3 is secured or prevented, then there is eliminated the possibility that, when the terminal tackles are thrown while the drag force is set in a weak level in consideration of the fishing line being cut by fish hitting the bait of the terminal tackles, the spool can be rotated due to the weight of the terminal tackles just as the terminal tackles are thrown when the fishing line is released. This, in turn, not only prevents the fingers of an operator from being damaged but also makes it possible for the operator to throw the terminal tackle securely.

If the spinning reel for fishing is structured in the above-mentioned manner, when the two bail support members 28 and 29 are reversed to their respective fishing line casting positions in the terminal tackle throwing operation, the rotation of the spool 3 is secured or prevented with respect to the spool shaft 4. Therefore, even if the drag mechanism A is set in a weak level, the spool 3 can be prevented from being rotated due to the weight of the terminal tackles, which in turn not only prevents the operator's fingers against damage but also can assure the secure terminal tackles throwing operation.

Also, after the terminal tackles are thrown, if the handle 11 is rotated in a direction in which the fishing line 40 can be rewound around the spool 3, then the rotor 2 is rotated forwardly and thus the other end portion 6a of the reverse-function lever 6 is butted against the cam 1b of the reel main body 1 and is pushed in backwardly to thereby reverse the two bail support members 28 and 29 to their respective fishing line retrieving positions, so that a return operation to return the two bail support members to their respective fishing line retrieving positions after the fishing line is played out can be carried out automatically.

Further, as the other end portion 6a of the reverse-function lever 6 is pushed in backwardly, the connecting body 5 is retreated to thereby cause the uneven portion 5b of the connecting body 5 to be removed from the uneven portion 7c of the lock member 7, so that removal of the unrotatable state of the spool 3 can be achieved automatically and easily, thereby allowing the spool 3 to rotate freely.

Figure 11:
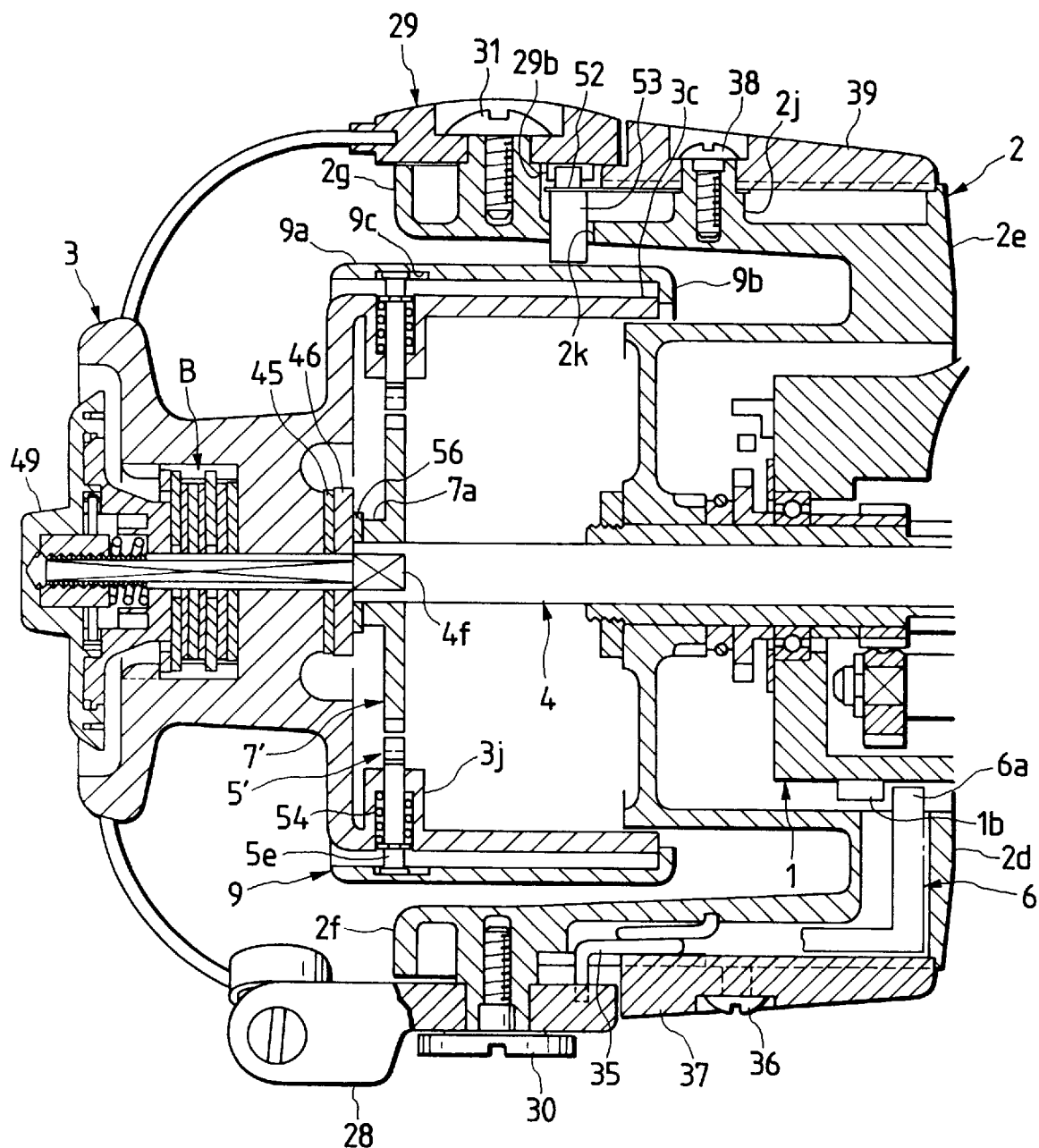
FIG. 11 is an enlarged sectional side view of the main portions of a second embodiment of a spinning reel for fishing according to the invention.
Figure 12:
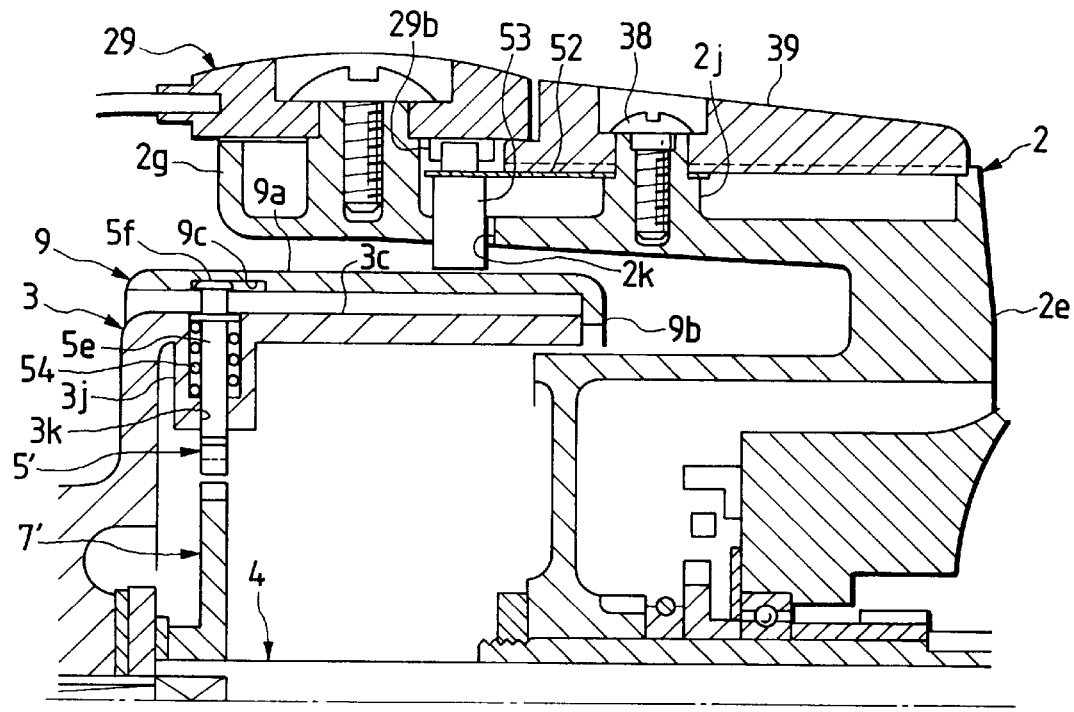
FIG. 12 is a partially enlarged sectional side view of the main portions shown in FIG. 11.
Figure 13:
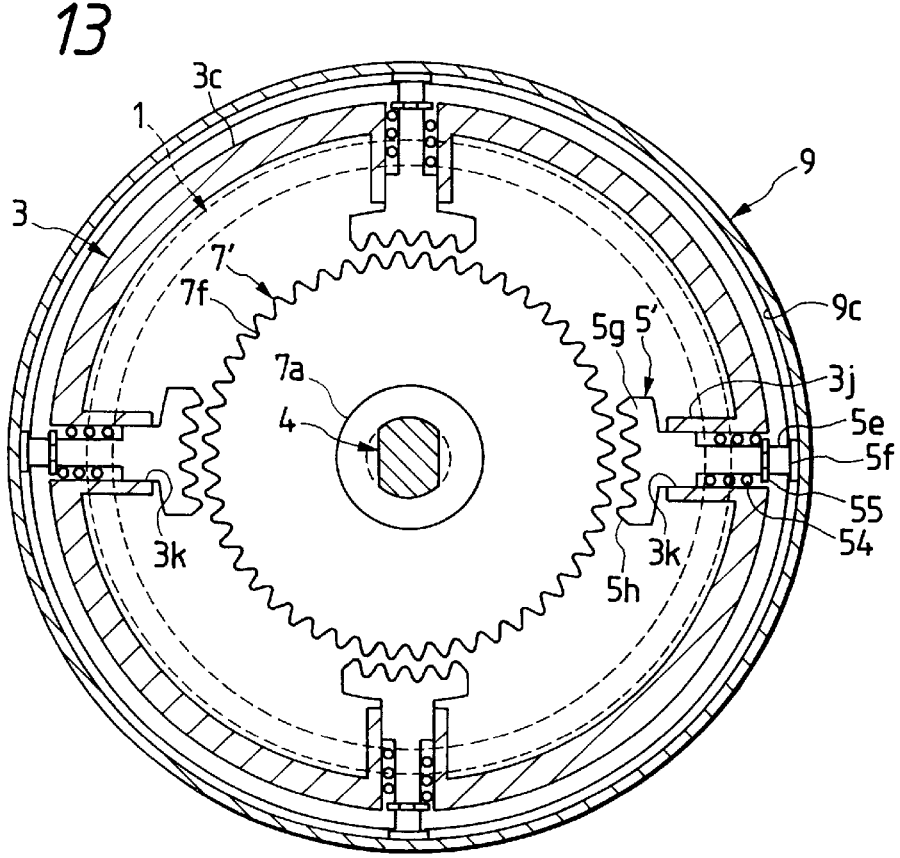
FIG. 13 is a front view of a spool, a lock member and a connecting body respectively employed in the second embodiment, with the spool shown in section.
Figure 14:
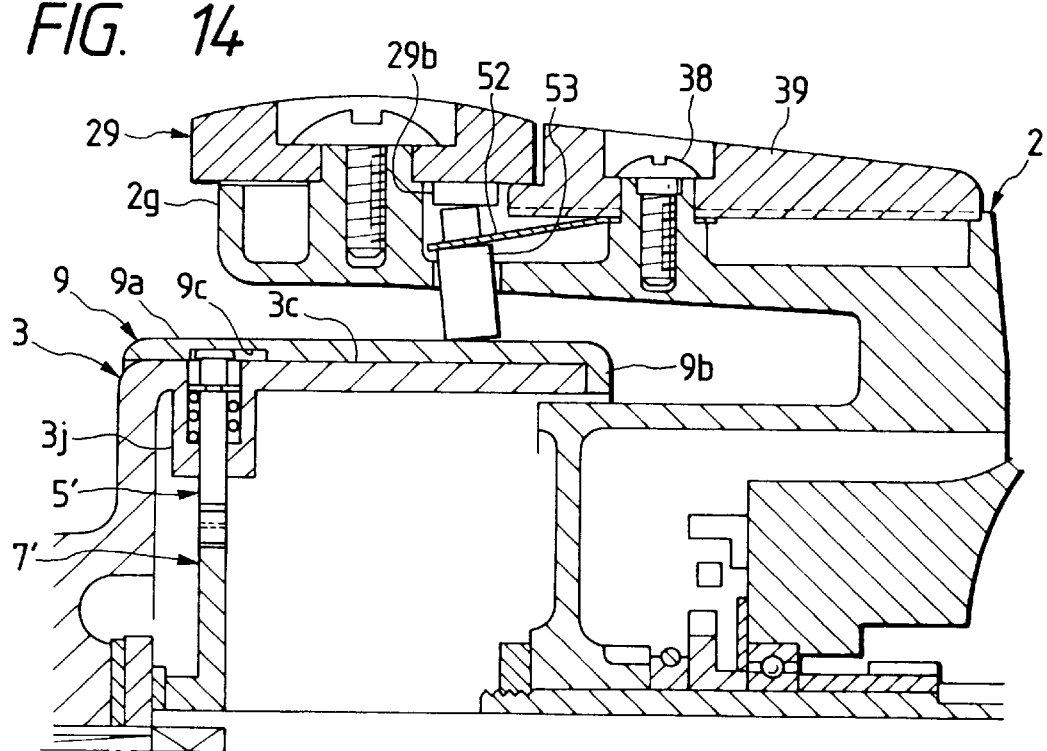
FIG. 14 is an enlarged sectional side view of the main portions of a spinning reel for fishing according to the second embodiment, showing a state thereof in which the spool is prevented against rotation.
Figure 15:
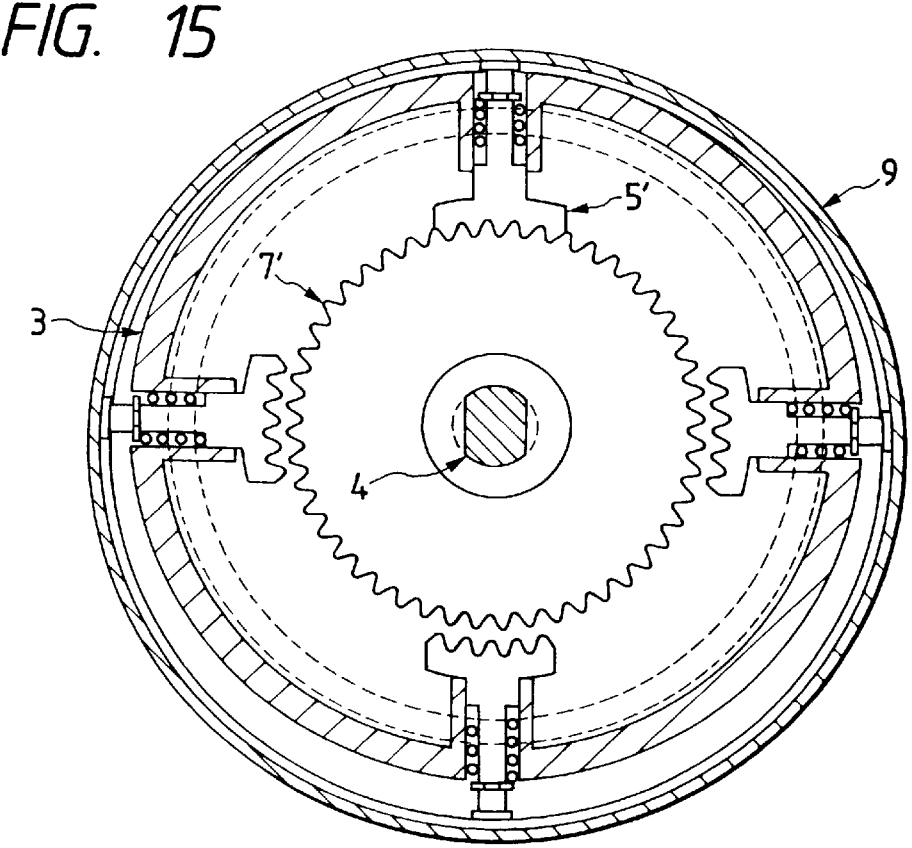
FIG. 15 is a front view of the above spool, lock member and connecting body, in which the spool is prevented against rotation and is shown in section.

Now, in FIGS. 11 to 15, there is shown a second embodiment of a spinning reel for fishing according to the invention. In particular, FIG. 11 is an enlarged sectional side view of the main portions of a spinning reel for fishing according to the second embodiment; FIG. 12 is an enlarged sectional side view of the main portions of a spinning reel for fishing shown in FIG. 11; FIG. 13 is a front view of a spool, a lock member and a connecting body respectively employed in the second embodiment, with the spool shown in section; FIG. 14 is an enlarged sectional side view of the main portions of the present spinning reel for fishing, showing a state thereof in which the spool is prevented against rotation; and, FIG. 15 is a front view of a spool, lock member and a connecting body respectively employed in the second embodiment, in which the spool is prevented against rotation and is shown in section.

In the second embodiment, an engaging and removing mechanism, which engages the spool 3 with the lock member secured unrotatably to the spool shaft 4 and removes the engagement between them in linking with a reversing operation to reverse the two bail support members 28 and 29 from their respective fishing line retrieving states to their respective fishing line casting states, is constituted by a pressure pin, which is mounted on a spring and, when it is pressed by a cam provided in the bail support member 29, presses down a cylindrical body 9 fitted with the outer periphery of the large-diameter cylindrical portion 3c of the spool 3 with a gap between them, a connecting body 5' which can be advanced to and retreated from the outer periphery of the large=diameter cylindrical portion 3c of the spool 3, and a lock member 7' consisting of a spur gear.

The reverse-function lever 6 is disposed within the bail support arm 2f on which the bail support member 28 is mounted.

The other remaining portions of the structure of the second embodiment are substantially the same as those of the previously described first embodiment.

In the second embodiment, the reversing mechanism for reversing the bail support members 28 and 29 may also be structured such that a butting member is fixed to the leg portion of the upper portion of a well-known reel main body 1 and the bail support member 28 is butted directly against the present butting member and is thereby reversed.

One bail support member 28 and the other bail support member 29 are respectively journaled on the outside of the respective leading end portions of a pair of bail support arms 2f and 2g of the rotor 2 by screws 30 and 31 in such a manner that they can be freely reversed between their respective fishing line retrieving and casting positions.

The other bail support member 29 includes a cam 29b on the lower surface thereof.

A spring 52 is placed on a base portion 2j, which is included within the bail support arm 2g of the rotor 2 and also with which a screw 38 can be threadedly engaged, and the spring 52 is also fixed together with a cover 39 to the present base portion 2j by the present screw 38.

A pressure pin 53 is mounted on the free end portion of the spring 52 and is positioned such that it can be pressed down by the cam 29b of the bail support member 29.

In the portion of the bail support arm 2g that corresponds in position to the pressure pin 53, there is formed a through hole 2k so that the pressure pin 53 is projected toward the spool 3 side through the through hole 2k.

A cylindrical body 9 is fitted with the outer periphery of a large-diameter cylindrical portion 3c of the spool 3 with a gap between them.

The cylindrical body 9 includes a cylindrical portion 9a and an inwardly extending flange portion 9b on the rear side of the cylindrical portion 9a, while the flange portion 9b is in butting contact with the rear end of the large-diameter cylindrical portion 3c of the spool 3, thereby preventing the cylindrical body 9 from slipping off forwardly.

There is formed a peripheral groove 9c in the inner periphery of the cylindrical portion 9a.

On the other hand, in the large-diameter cylindrical portion 3c of the spool 3, there are formed a plurality of hollow cylinders 3j which respectively extend inwardly of the cylindrical portion 3c.

In the bottom portion of each of the hollow cylinders 3j that is situated on the spool shaft 4 side thereof, there is formed an angular hole 3k.

The shaft portion 5e of the connecting body 5' is inserted into the hollow cylinder 3j and is also energized upwardly by a spring 54 and an E ring 55.

A head portion 5f is fixed to the upper end of the shaft portion 5e and is also inserted into the peripheral groove 9c of the cylindrical body 9.

A flat plate 5g is formed in the lower end of the shaft portion 5e and, in the portion of the flat plate 5g on the spool shaft 4 side thereof, there is provided a teeth-shaped uneven portion 5h.

The spool shaft 4 includes a rotation preventive portion 4f in the outer periphery thereof and the central cylindrical portion 7a of the lock member 7' is prevented against rotation by the rotation preventive portion 4f.

The lock member 7' includes a teeth-shaped uneven portion 7f in the outer periphery thereof.

A washer 56 is inserted between the lock member 7' and brake plate 46.

Referring now to the operation of the above-mentioned second embodiment, when the terminal tackles are thrown and the fishing line 40 is thereby played out far away, the two bail support members 28 and 29 are respectively reversed to the fishing line casting positions, so that the fishing rod can be swung down vigorously.

When the two bail support members 28 and 29 are respectively reversed to the fishing line casting positions, then the other end portion 6a of the reverse-function lever 6 is advanced and the reversal of the bail support member 29 causes the cam 29b of the bail support member 29 to press down the pressure pin 53 against the force of the spring 52.

When the pressure pin 53 is pressed down, then the cylindrical body 9 and connecting body 5' are also pressed down to thereby cause the uneven portion 5h of the connecting body 5' to be secured to the uneven portion 7f of the lock member 7'.

When the uneven portion 5h of the connecting body 5' is secured to the uneven portion 7f of the lock member 7', then the spool 3 is secured or prevented against rotation with respect to the spool shaft 4.

After the terminal tackles are thrown, if the handle 11 is rotated in a direction in which the fishing line 40 can be wound around the spool 3, then the drive gear 10 is rotated to thereby cause the rotary shaft cylinder 14 and rotor 2 to be rotated forwardly through the pinion 14a.

As the rotor 2 is rotated forwardly, the other end portion 6a of the reverse-function lever 6 is butted against the cam 1b of the reel main body 1 and is pushed in backwardly, while the two bail support members 28 and 29 are respectively reversed to the fishing line retrieving positions.

The reversal of the bail support members 28 and 29 removes the depressed condition of the pressure pin 53 due to the cam 29b of the bail support member 29 to thereby cause the cylindrical body 9 and connecting body 5' to return to their respective original positions, so that the uneven portion 5h of the connecting body 5' is separated from the uneven portion 7f of the lock body 7'. As a result, the spool 3 is allowed to rotate freely.

Figure 16:
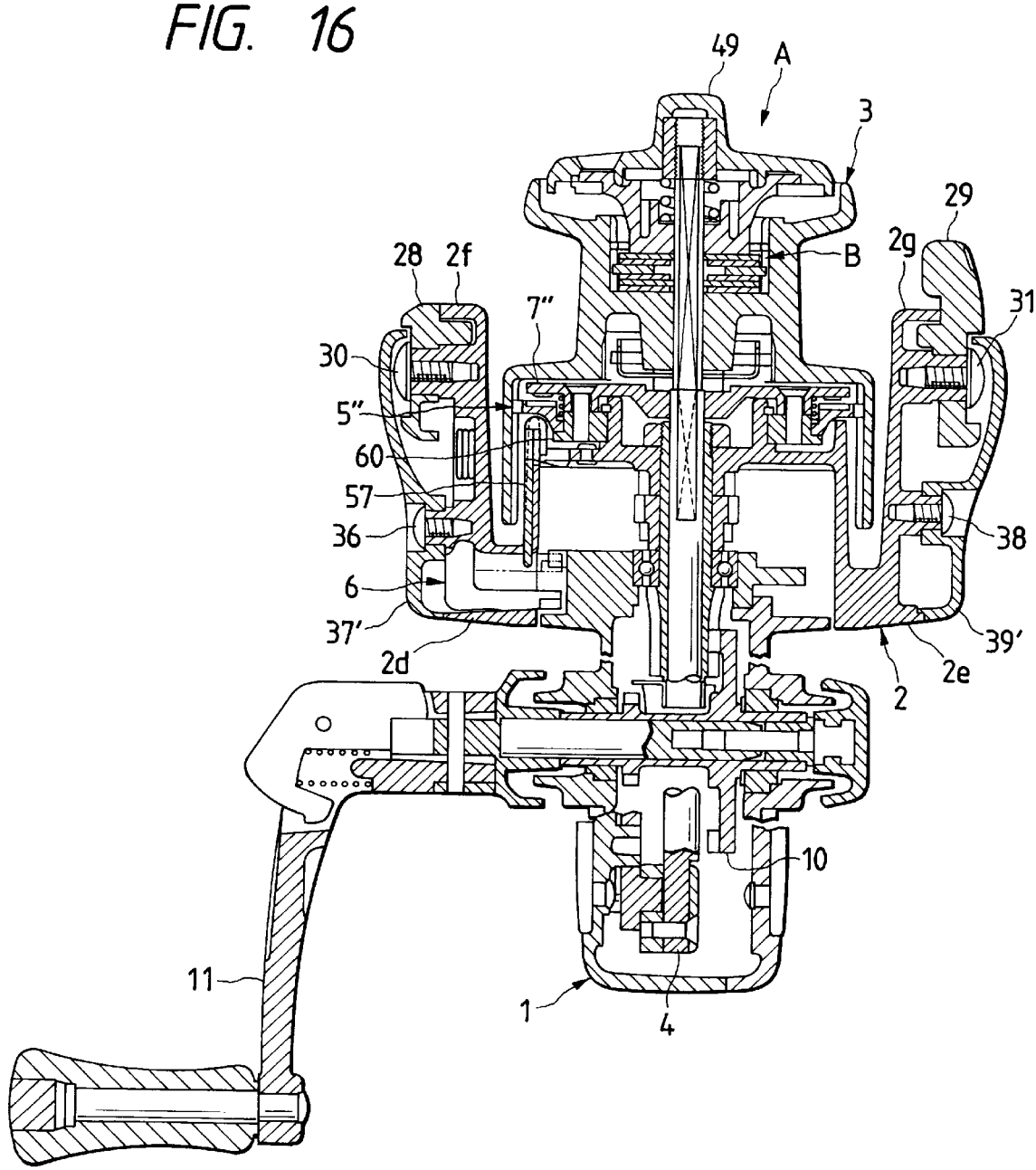
FIG. 16 is a sectional plan view of a third embodiment of a spinning reel for fishing according to the invention.
Figure 17:
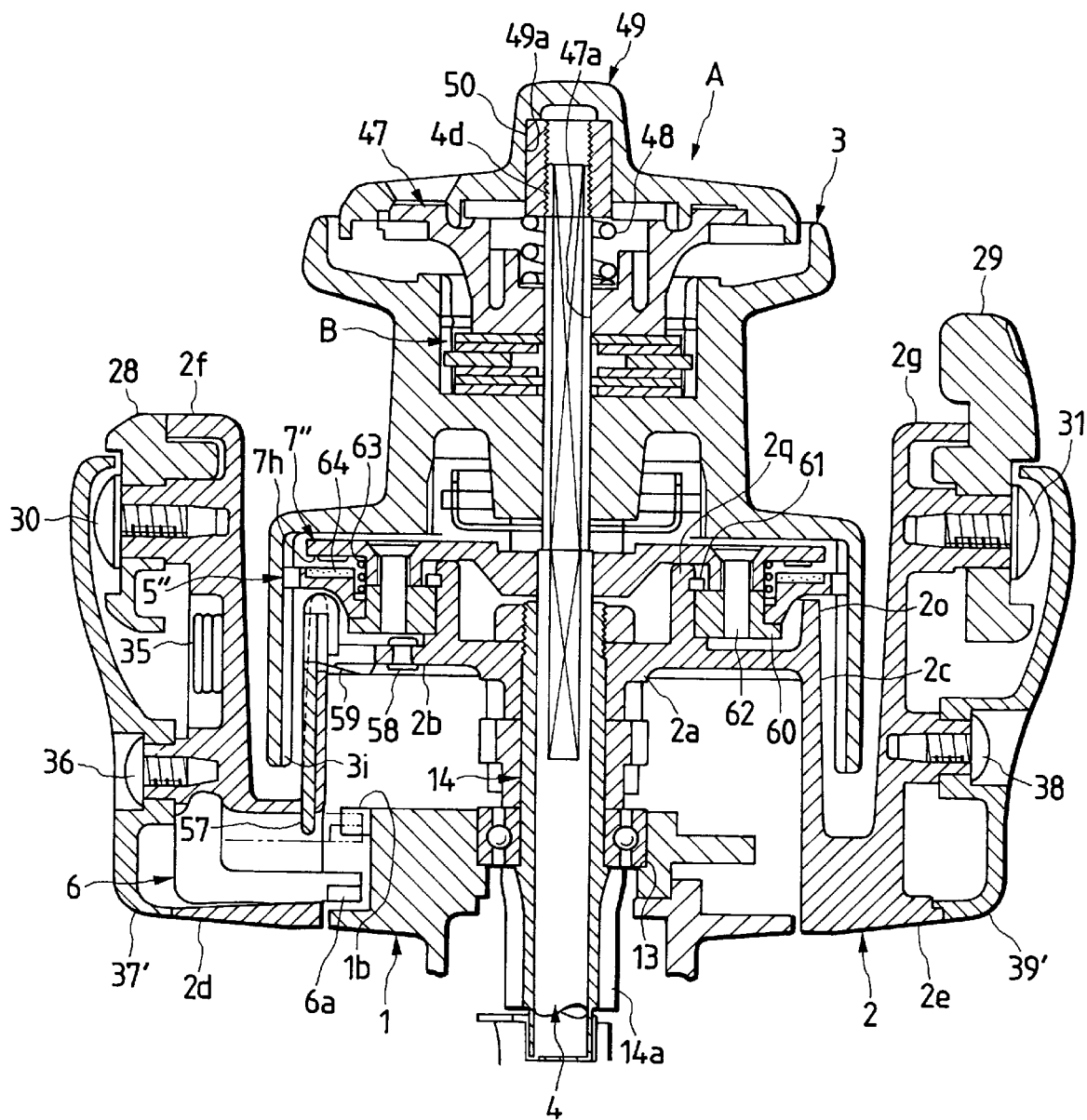
FIG. 17 is a partially enlarged sectional plan view of the spinning reel for fishing shown in FIG. 16.
Figure 18:
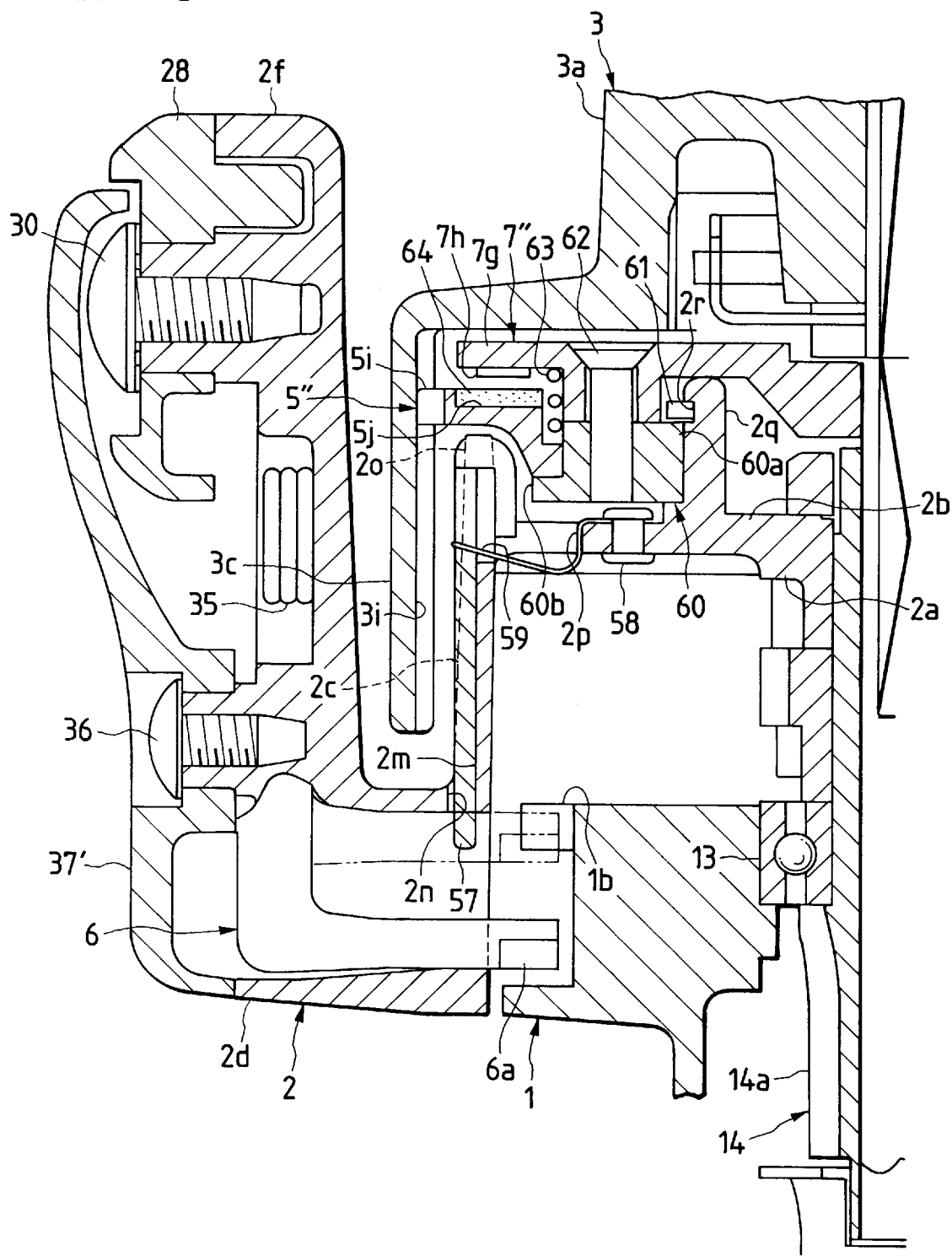
FIG. 18 is an enlarged sectional plan view of the main portions shown in FIG. 17.
Figure 19:
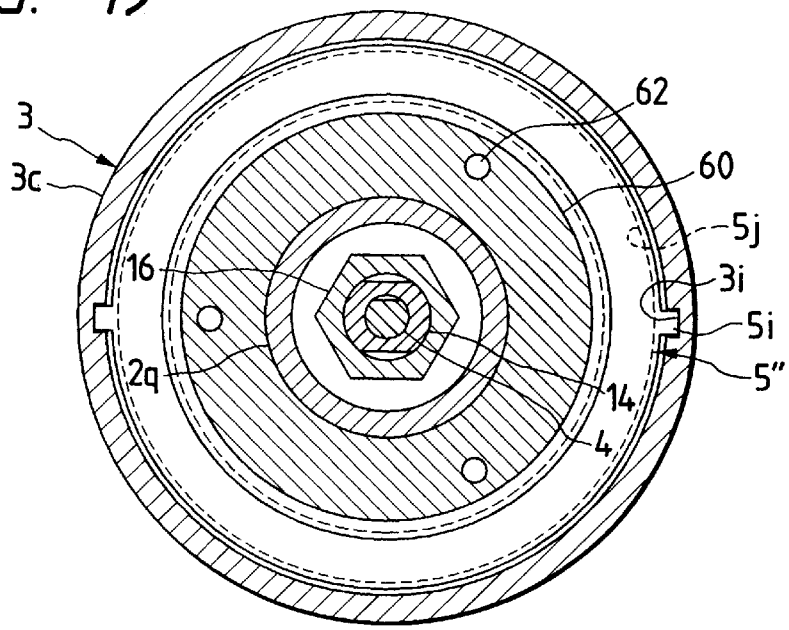
FIG. 19 is a sectional back view of the main portions of the above spool and connecting body; and, FIG. 20 is a perspective view of a slide arm and a rotor respectively employed in the third embodiment and a partially enlarged perspective view thereof.
Figure 20:
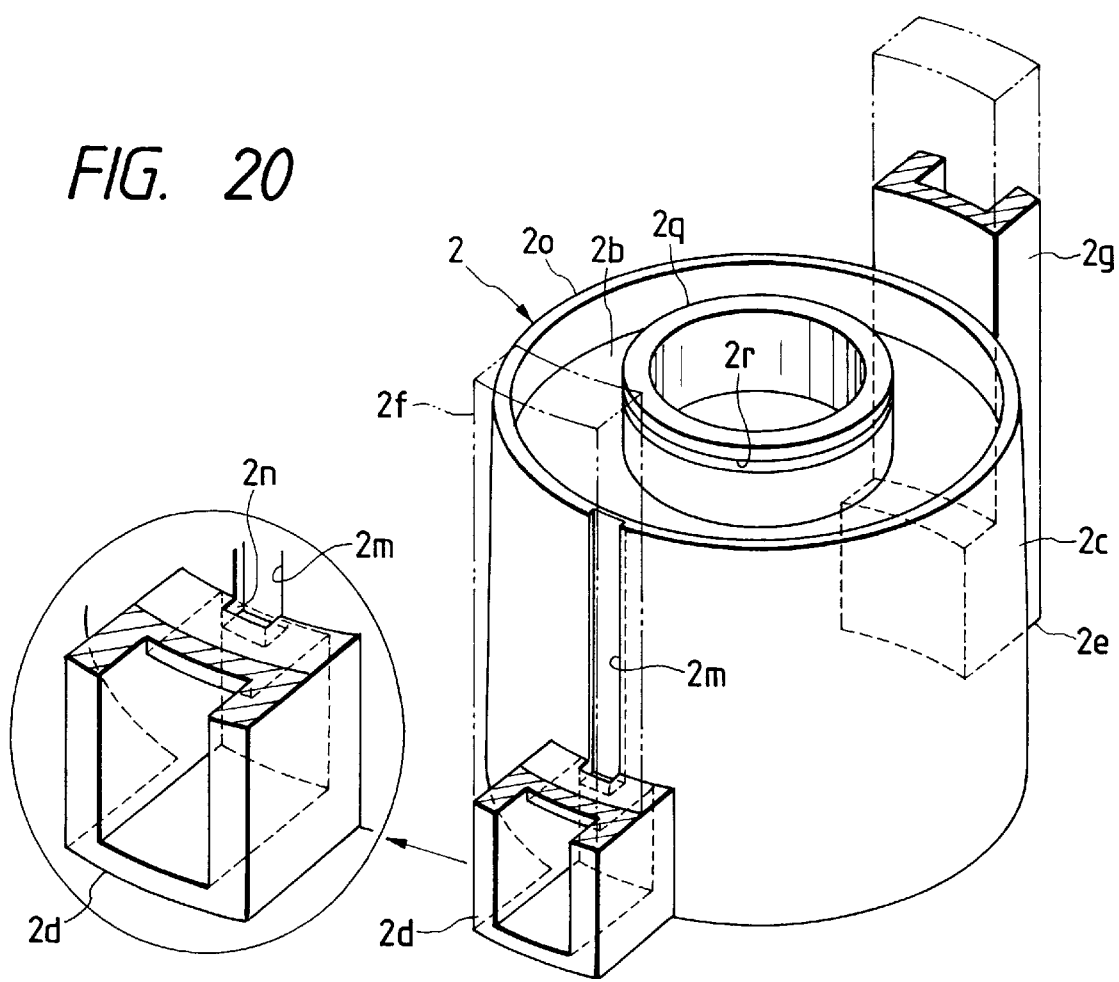

Now, in FIGS. 16 to 20, there is shown a third embodiment of a spinning reel for fishing according to the invention. In particular, FIG. 16 is a sectional plan view of a spinning reel for fishing according to the third embodiment; FIG. 17 is a partially enlarged sectional plan view of the spinning reel for fishing shown in FIG. 16; FIG. 18 is an enlarged sectional plan view of the main portions of the above spinning reel; FIG. 19 is a sectional back view of a spool and a connecting body employed in the third embodiment; and, FIG. 20 is a perspective view of the main portions of a slide arm and a rotor respectively employed in the third embodiment and an enlarged perspective view of part of the main portions.

In the third embodiment, a rotor 2 is structured such that a cylindrical portion 2a thereof is mounted on a rotary shaft cylinder 14. Also, the rotor 2 is constituted by the cylindrical portion 2a, a front wall 2b, a large-diameter cylindrical portion 2c, and a pair of support arms 2f and 2g which are respectively provided on and projected forwardly from the outer peripheries of the base portions 2d and 2e of the large-diameter cylindrical portion 2c.

One bail support member 28 and the other support member 29 are reversibly journaled on the outer sides of the respective leading end portions of the pair of bail support arms 2f and 2g by screws 30 and 31, respectively.

Within one support arm 2f, there are disposed an L-shaped reverse-function lever 6 and a torsion spring 35, while the torsion spring 35 has one end secured to the interior of the support arm 2f and the other end secured to the bail support member 28. Also, the torsion spring 35 is covered with a cover 37' fixed by a screw 36.

The other bail support arm 2g is similarly covered with a cover 39' which is fixed by a screw 38, In the outer periphery of the large-diameter cylindrical portion 2c of the rotor 2, there is formed a groove 2m extending along the axial direction of the rotor 2, while a through hole 2n is formed in the base portion 2d of the large-diameter cylindrical portion 2c. A slide arm 57 is fitted with the outer periphery of the large-diameter cylindrical portion 2c of the rotor 2 in such a manner that it is free to move back and forth, while the rear end of the slide arm 57 is disposed such that it can be freely pressed forwardly by the other end 6a of the reverse-function lever 6.

The leading end portion of the slide arm 57 is bent in a U shape and is in engagement with a forwardly projecting portion 2o of the rotor 2 in such a manner that it can be freely moved back and forth, while the front side of the leading end portion of the slide arm 57 is so positioned as to face the back surface of a connecting body 5".

The rotor 2 includes a cut-away portion 2p which is formed in part of a front wall 2b of the rotor 2, and a spring member 59 is fixed by a rivet 58 to the portion of the front wall 2b that is situated laterally of the cut-away portion 2p.

The free end of the spring member 59 is secured to the slide arm 57.

In the front wall 2b of the rotor 2, there is formed a cylindrical portion 2q which extends forwardly and has a demeter smaller than the large-diameter cylindrical portion 2c.

In the outer periphery of the cylindrical portion 2q, there is formed a peripheral groove 2r, while a cylindrically shaped hold member 60 is rotatably fitted with the outer periphery of the cylindrical portion 2q and is also prevented against slippage by a retainer 61.

The lock member 7" is fitted movably but unrotatably with the portion of the spool shaft 4 that is situated forwardly of the cylindrical portion 2q of the rotor 2.

The hold member 60 is fixed to the disc portion 7g of the lock member 711 by a screw 62.

There is provided a projection 7h on the outer back surface of the disc portion 7g.

The hold member 60, which is formed in a cylindrical shape, includes a cylindrical portion 60a and a flange portion 60b, while the connecting body 5" is fitted rotatably and in a back-and-forth movable manner with the outer periphery of the cylindrical portion 60a of the hold member 60 and is also pressed against the flange portion 60b of the hold member 60 by a spring 63.

The connecting body 5" is formed in a disc shape and includes a projecting portion 5i in the outer periphery thereof and a recessed portion 5j formed inwardly of the outer periphery thereof.

The projecting portion 5i of the connecting body 5" is inserted in a back-and-forth movable manner into grooves 3i which are respectively so formed in the inner periphery of a large-diameter cylindrical portion 3c of a spool 3 as to extend in the axial direction of the spool 3.

Here, a securing portion 64 formed of elastic material such as rubber or the like may be fitted with and fixed to the recessed portion 5j of the connecting body 5", or an uneven securing portion 64 may be formed within the recessed portion 5j. The recessed portion 5j is positioned such that it is engageable with the projection 7h of the lock member 7".

The remaining portions of the structure of the third embodiment are substantially the same as those of the previously described first embodiment.

In the third embodiment an engaging and removing mechanism, which engages the spool 3 with the lock member secured unrotatably to the spool shaft 4 and removes the engagement between them in linking with the reversing operation to switch or reverse the two bail support members 28 and 29 from their respective fishing line retrieving states to their respective fishing line casting states, is constituted by the slide arm 57 to be pressed forwardly by the L-shaped reverse-function lever 6, the connecting body 5" to be pressed forwardly by the slide arm 57, and the lock member 7" with which the connecting body 5" can be engaged.

Referring now to the operation of the third embodiment, when the terminal tackles are thrown and the fishing line 40 is thereby played out far away, the two bail support members 28 and 29 are respectively reversed to their respective fishing line casting positions and thus the fishing rod can be swung down vigorously.

When the two bail support members 28 and 29 are respectively reversed to the fishing line casting position, then the other end portion 6a of the reverse-function lever 6 is advanced to thereby push the slide arm 57 forwardly, so that the connecting body 5" is pushed forwardly.

As the connecting body 5" is pushed forwardly, the securing portion 64 is engaged with the projection 7h of the lock member 7", so that the spool 3 is prevented against rotation with respect to the spool shaft 4.

After the terminal tackles are thrown, if the handle 11 is rotated in a direction where the fishing line 40 can be wound around the spool 3, then the drive gear 10 is rotated so that the rotary shaft cylinder 14 and rotor 2 are respectively rotated forwardly through the pinion 14a.

With the forward rotation of the rotor 2, the other end portion 6a of the reverse-function lever 6 is butted against the cam 1b of the reel main body 1 and is thus pushed in backwardly, so that two bail support members 28 and 29 are respectively reversed to their fishing line retrieving positions.

The reversal of the two bail support members 28 and 29 not only allows the spring member 59 to push in the slide arm 57 backwardly but also allows the spring 63 to push in the connecting body 5" backwardly, so that the slide arm 57 and connecting body 5" are returned to their respective original positions. As a result, the engagement between the securing portion 64 and the projection 7h of the lock member 7" is removed, thereby setting the spool 3 free to rotate.

Here, the above-mentioned structure for securing the free end of the spring member 59 to the slide arm 57 may be replaced by another structure, that is, a through hole may be formed in the slide arm 57 and then the free end of the spring member 59 may be secured to the present through hole.

Also, the free end of the spring member 59 may be bent formed in a hook shape and then may be secured to the slide arm 57.

As in the third embodiment, when the engaging and removing mechanism for engaging the spool 3 with the lock member 7" secured unrotatably to the spool shaft 4 and removing the engagement therebetween is constituted by the slide arm 57 and connecting body 5" which can be respectively operated in linking with the reversing operation to reverse the bail support members 28 and 29 from their respective fishing line retrieving states to the fishing line casting states, the slide arm 57 and connecting body 5" are disposed inwardly of the large-diameter cylindrical portion 3c of the spool 3 such that they are free to move in the axial direction of the spool 3. Therefore, in a limited space situated between the rotor 2 and the rear portion of the spool 3 where the sizes of the spool 3 and rotor 2 are restricted due to the line winding capacity and the like, a lock mechanism can be provided or secured while preventing the size of the lock mechanism from increasing in the diametrical direction thereof.

As has been described heretofore, according to the invention, when the bail support members are reversed to their respective fishing line casting positions to throw the terminal tackles of the spinning reel, the spool is prevented against rotation with respect to the spool shaft. Due to this, even if the drag mechanism is set in a weak level, the rotation of the spool due to the weight of the terminal tackles can be prevented, which in turn prevents operator's fingers against damage and assures the secure throwing of the terminal tackles.

Also, after the terminal tackles are thrown, if the handle is turned in a direction in which the fishing line can be wound around the spool, then the rotor is rotated forwardly so that the bail support members are reversed to their respective fishing line retrieving positions by the reversing mechanism automatically. As a result, a return operation to return the bail to the fishing line take-up position after casting of the fishing line can be carried out automatically.

Further, if the bail support members are reversed or switched to their respective fishing line retrieving positions, then the connector body is retreated and is thereby detached from the lock member, so that the unrotatable state of the spool can be removed automatically and easily, thereby setting the spool free to rotate. That is, according to the invention, it is possible to provide a spinning reel for fishing which has such excellent effects as described above.

What is claimed is:

1. A spinning reel for fishing of a type in which a bail is attached through a bail support member to a rotor, the rotor being rotatable by operation of a handle and the bail being disposed for movement between a fishing line retrieving position and a fishing line casting position, wherein a fishing line is wound by rotation of the rotor around a spool supported rotatably on a spool shaft through a drag mechanism, said spinning reel comprising:

connecting body movably attached to the rotor;

a lock member mounted unrotatably to the spool shaft; and a reverse mechanism movably attached to the rotor and operably connected between the bail support member and said connecting body for moving said connecting body into and out of engagement with said lock member, wherein said connecting body engages said lock member by operation of said reverse mechanism when the bail is moved from the fishing line retrieving position to the fishing line casting position, in order to prevent the spool from rotating when the bail is held in the fishing line casting position, and wherein said connecting body automatically disengages from said lock member by operation of said reverse mechanism when the rotor is rotated in a fishing line retrieving direction.

2. A spinning reel for fishing as set forth in claim 1, wherein said connecting is moved in an axial direction of the spool to be engaged with said lock member to thereby cause the spool to be unrotatable, when the bail is held in the fishing line casting position, and said connecting body is disengaged from said lock member to thereby cause the spool to be rotatable, when the bail is held in the fishing line retrieving position, and wherein the bail is automatically returned from the fishing line casting position to the fishing line retrieving position by operation of said reverse mechanism when the rotor is rotated in the fishing line retrieving direction.

3. A spinning reel for fishing as set forth in claim 1, wherein said spinning reel comprises a reel body, said reel body comprises a cam, and said reverse mechanism comprises a lever, said lever being connected to said connecting body, wherein one end of said lever contacts said cam when the rotor is rotated in said fishing line retrieving direction so as to move said connecting body out of engagement with said lock member.

4. A spinning reel for fishing of a type in which a bail is attached through a bail support member to a rotor, the rotor being rotatable by operation of a handle and the bail being disposed for movement between a fishing line retrieving position and a fishing line casting position, and wherein a fishing line is wound by rotation of the rotor around a spool supported rotatably on a spool shaft through a drag mechanism, said spinning reel comprising:

a connecting body attached to the rotor and disposed for movement in an axial direction of the spool shaft when the bail is moved between the fishing line retrieving and casting positions;

a lock member connected to the spool shaft so as to allow relative axial motion between said lock member and the spool shaft and prevent relative rotational motion of said lock member and the spool shaft; and a reverse mechanism operably connected between the bail support member and said connecting body for moving said connecting body into and out of engagement with said lock member, wherein said connecting body engages said lock member by operation of said reverse mechanism when the bail is moved from the fishing line retrieving position to the fishing line casting position, in order to prevent the spool from rotating, and wherein said connecting body is automatically disengaged from said lock member by operation of said reverse mechanism when the rotor is rotated in a fishing line retrieving direction.

5. A spinning reel for fishing as set forth in claim 4, wherein said spinning reel comprises a reel body, said reel body comprises a cam, and said reverse mechanism comprises a lever, said lever being connected to said connecting body, wherein one end of said lever contacts said cam when the rotor is rotated in said fishing line retrieving direction so as to move said connecting body out of engagement with said lock member.

* * * * *